United States Patent [19]
Modler et al.

[11] 3,893,976
[45] July 8, 1975

[54] POLYESTER RESINS

[75] Inventors: Robert F. Modler; Stuart A. Harrison, both of Minneapolis, Minn.

[73] Assignee: General Mills Chemicals, Inc., Minneapolis, Minn.

[22] Filed: Aug. 23, 1974

[21] Appl. No.: 499,817

Related U.S. Application Data

[63] Continuation-in-part of Ser. No. 362,641, May 21, 1973, abandoned.

[52] U.S. Cl. ........... 260/75 A; 156/332; 260/75 UA
[51] Int. Cl. ............................................. C08g 17/10
[58] Field of Search ........... 260/75 R, 75 UA, 75 A; 156/332; 161/226

[56] References Cited
UNITED STATES PATENTS

| | | | |
|---|---|---|---|
| 2,819,299 | 1/1958 | Teeter et al. | 260/514 |
| 3,436,301 | 4/1969 | McHale | 161/226 |
| 3,505,293 | 4/1970 | Bond et al. | 260/75 R |
| 3,682,863 | 8/1972 | McHale | 260/75 R |

*Primary Examiner*—Melvin Goldstein
*Assistant Examiner*—W. C. Danison
*Attorney, Agent, or Firm*—Anthony A. Juettner; Patrick J. Span; Elizabeth Tweedy

[57] ABSTRACT

Low modulus of elasticity polyesters derived from 1,4-butanediol and terephthalic acid, isophthalic acid and an acid selected from certain cyclic dicarboxylic acids.

2 Claims, No Drawings

POLYESTER RESINS

This application is a continuation-in-part of our earlier application Ser. No. 362,641 filed May 21, 1973, now abandoned.

This invention relates to resins of linear polyesters of 1,4-butanediol condensed with terephthalic acid, isophthalic acid and a third acid component having the general formula:

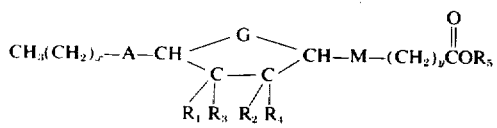

wherein $x$ is 1 to 3 and $y$ is 5 to 8, the sum of $x$ and $y$ is 6 to 11, $R_1$ and $R_2$ are H or $CH_3$ with the proviso that one of such radicals must be H and $R_3$ and $R_4$ are H, —COOH, —COOCH$_3$ or —COOCH$_2$CH$_3$ with the proviso that one of such radicals must be H and the other must be —COOH, —COOCH$_3$ or —COOCH$_2$CH$_3$. $R_5$ is —COOH, —COOCH$_3$ or —COOCH$_2$CH$_3$, A, G and M are —CH$_2$CH$_2$— or —CH=CH—, with the proviso that all can be —CH$_2$—CH$_2$— or when G is —CH=CH— one of either A or M is —CH=CH—. Monomeric acids of this type can be prepared by methods known in the art. Preparation of dicarboxylic acids of this type is set out in U.S. Pat. No. 2,452,029 herein incorporated by reference. Briefly, this method involves reacting by addition at about 80° to about 300°C. esters of acrylic acid and long chain fatty acids, or esters thereof, in which there are present two olefinic linkages in conjugate relationship. The reaction is preferably conducted in the presence of a polymerization inhibitor such as hydroquinone, pyrogallol, napthylamine, α-naphthol, diphenylamine, or the like. The amount of unsaturation existing in the monomer after the addition reaction depends upon the amount of unsaturation in the fatty acid used in the addition reaction. Typical fatty acids used are tung oil, β-eleostearic acid, β-liconic acid, octadecandienic acid and the like. Saturated monomers are made by hydrogenating the unsaturated monomers. Hydrogenation is commonly carried out in the presence of catalysts such as nickel.

The isophthalic and terephthalic acids included in the polyesters have the respective formulae:

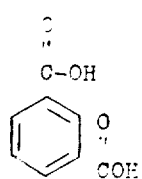

isophthalic acid

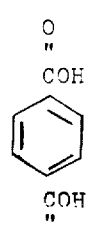

terephthalic acid

In making the polyesters of this invention the methyl or ethyl esters of the above acids can be used. The methyl esters of the respective acids are preferred as the starting materials.

The above acid components, in the form of the acids, methyl or ethyl esters, are condensed with 1,4-butanediol which has the formula:

$$HOCH_2CH_2CH_2CH_2OH$$

The formation of the polyesters takes place in two steps. The first step involves the formation primarily of the bisglycol esters from the reaction of the 1,4-butanediol with the various acids, methyl or ethyl esters. Respectively the by-products formed are water, methanol and ethanol. The progress of the reaction can be measured by observing the amount of by-product formed. The reaction can be conducted by heating the reaction mixture to a temperature of about 150° to 250°C. preferably by slowly raising the temperature from about 150° to about 250°C. The reaction is preferably conducted in the presence of a catalyst. To avoid discoloration the reaction is preferably conducted in an atmosphere of an inert gas, i.e. nitrogen.

The second step of the polyester formation is the final polymer formation. The final polymerization is carried out under vacuum in the order of about 0.2 to 10 mm. Hg. at a temperature of about 240° to 260°C. Preferably the pressure is gradually reduced from the pressures used in the first step, about 700 mm. Hg., to about 10 mm. Hg. or less. Preferably a final pressure of less than about 5 mm. Hg. is obtained. The reaction mixture is held at this pressure until the desired molecular weight is achieved. The degree of polymerization is a function of the degree of vacuum applied and the time.

It is preferred that both steps of the reaction be conducted in the presence of a polymerization catalyst. Useful catalysts include titanium compounds such as tetra-n-butyl orthotitanate and tetraamine titanate, lead salts such as lead acetate, tin compounds such as dibutyl stannic oxide and antimony compounds such as antimony oxide.

In the final condensation, the 1,4-butanediol component and the total of the acid components are present in substantially 1:1 equivalent ratio. Preferably the acid equivalent percentages of the total acid equivalent are about 65 to 75% terephthalic acid, about 20 to 25% isophthalic acid and about 5 to 10% of the cyclical dicarboxylic acid set out above. The polyesters have a sufficient molecular weight to produce an inherent viscosity of about 0.4 to 1.0 as measured in orthochlorophenol solvent at a concentration of 0.5% by weight at a temperature of 30°C.

These new linear polyesters are hot melt adhesives particularly useful as adhesives in making shoes. They set quickly to a hardness which permits smoothing by sanding, an essential in shoe manufacture. Heretofore, polyesters of 1,4-butanediol and mixtures of terephthalic acid, isophthalic acid and sebacic acid have been used as shoe adhesives. It has been found that the polyesters of the present invention while hard enough to sand have a far greater elongation capacity and therefore are more flexible than the adhesives made from sebacic acid.

The mechanical properties of polyesters can be characterized on an Instron Tensile Tester Model TTC using ASTM 1708-59T procedure. The polyester is compression molded into a 6 × 6 inch sheet of approximately 0.04 inch thickness, at a temperature near its melting point (usually a few degrees lower than the melting point) and at 40,000 lbs. load or higher. From this sheet, test specimens are die cut to conform to ASTM 1708-59T. The test specimen is clamped in the jaws of the Instron Tester. Cross head speed is usually 0.5 inch/minute at 100 pounds full scale load. Chart speed is 0.5 inch/minute. Tensile strength (reference: ASTM D-1708-59T) is calculated as:

$$\text{Ultimate tensile strength} = \frac{\text{maximum load in pounds}}{\text{cross sectional area (sq. in.)}}$$

Percent elongation is calculated as:

$$\text{Percent elongation} = \frac{\text{gage length at break} - \text{gage length of 0 load} \times 100}{\text{gage length at 0 load}}$$

In addition to ultimate tensile strength and elongation, the following properties of the polymers prepared were measured according to:
1. Ball and ring softening point — ASTM E28-58T
2. 2% Tensile modulus — ASTM D1530-58T
3. Yield stress — ASTM D638-60T Set out below are examples of typical procedures for making the starting dicarboxylic acid, making the polyesters, and illustrations of polyester composition. Also shown are the properties of polyesters heretofore used in shoe manufacture and the corresponding properties of the polyesters of this invention.

EXAMPLE I

This example sets out one method of making the $C_{21}$ acids used as starting materials for making polyesters the preparation and properties of which are set out in Examples II and III.

In general, the procedure comprises (1) methanolysis of tung oil to tung methyl esters, (2) adduction of tung methyl esters with methyl acrylate to unsaturated adduct diester, (3) hydrogenation of the unsaturated adduct diester to saturated adduct diester, (4) fractional distillation of the methyl esters to provide a residue of crude $C_{21}$ dimethyl ester, (5) wiped film distillation of crude $C_{21}$ dimethyl ester to give saturated $C_{21}$ dimethyl ester.

METHANOLYSIS

The following reactants were charged into a steel reactor
  1000.0 pounds (3.46 pounds eq.) tung oil, sap. eq. wt. 289
  34.3 pounds 25% sodium methoxide in methanol solution
  8.6 pounds (0.159 pound eq.) $NaOCH_3$, eq. wt. 54
  25.7 pounds methanol (6.92 pounds eq.), eq. wt. 32
  196.0 pounds methanol 100% excess Over a period of about an hour the temperature of the reactants was raised to a temperature between 60° to 70°C. with agitation. The agitation and heating were then stopped and the reaction mixture allowed to separate into phases over a period of half an hour. The lower glycerol phase was separated from the reaction mixture and acetic acid was added to the reaction mixture to neutralize any residual methoxide. Five hundred pounds of water was added. The reaction mixture was then agitated for a period of 15 minutes at a temperature of 60°C. The reaction mixture was then again allowed to separate into phases and the aqueous phase removed. The aqueous washing was repeated 5 or 6 times. The reaction mixture was then put under a vacuum at 15 mm Hg at a temperature of 80°C. to remove volatile tung methyl esters.

ADDUCTION

The following reactants were charged into a steel reactor
  980.0 pounds tung methyl ester, 80% methyl eleostearate
  78.4 pounds (2.62 pounds eq.) methyl eleostearate, eq. wt. 292
  196.0 pounds fatty methyl esters
  323.0 pounds (3.75 pounds eq.) methyl acrylate, eq. wt. 86.1
  3.2 pounds $p$-methoxyphenol, 1% of methyl acrylate The reactant mixture was agitated and the temperature raised to 150°C and held at that temperature for a period of 24 hours. The reactor was vented and a partial vacuum applied to strip the methyl acrylate. The vacuum was then broken with nitrogen.

HYDROGENATION

The following reactants were charged into a steel reactor
  1202 pounds (5.9 pounds eq.) unsaturated adduct diester, unsaturation eq. wt. 204
  3 pounds 5% palladium on charcoal catalyst, 0.25%
  2270 SCF (5.9 pounds eq.) hydrogen (11.8 pounds)

Hydrogen was added to a pressure of 900 psi while the reaction mixture was agitated and its temperature raised to 200°C. The reaction mixture was then held at that temperature for 7 hours and then cooled to a temperature of 100°C. The product was filtered.

DISTILLATION

The hydrogenated product was then refined by fractional distillation carried out at vacuums of 10 to 20 mm Hg and temperatures of 260° to 270°C. to remove volatile materials. Further refinement was conducted by wiped film distillation using a two inch laboratory glass unit at a temperature between 200° and 300°C. to remove high boiling materials.

The final product was the saturated $C_{21}$ methyl ester.

EXAMPLE II

The equipment employed was stainless steel reactor with a glass top, a glass mantle heater, a high powered air driven stirrer, a nitrogen inlet tube, a thermocouple connection, and an outlet to a column with a thermometer at the head and take off to a condenser and receiver. The heating of the reactor was controlled by an automatic pyrometer, which was connected to the thermocouple. Heating tape was used to heat the upper (glass) part of the reactor, and both water aspirator and high vacuum (via pump) could be applied through the receiver.

1,4-Butanediol (GAF Tech Grade) 200 g., 2.2 moles was charged into the reactor, which was then heated to 125°C. Aspirator vacuum was applied for 15 minutes to remove water and other volatiles.

Nitrogen was then passed into the reactor, and the reactor opened. Dimethyl terephthalate pellets (American Oil Co.), 135.8 g., 0.70 mole, dimethyl isophthalate (Eastman Kodak, Inc.), 38.8 g., 0.20 mole, dimethyl ester of an isomeric mixture of cyclical dicarboxylic acids 38.4 g., 0.10 mole and tetra n-butyl orthotitanate (Tyzor TBT, duPont), 10 drops, were added to the reaction mixture. The isomeric mixture of cyclical dicarboxylic acids was obtained from the reaction of acrylic acid with eleostearic acid and subsequently hydrogenating the product as described above. The reactor containing the above constituents was flushed with nitrogen and heated to 150°C. The dimethyl terephthalate was observed to melt at 135°C., after which high powered stirring was begun. Methanol began to appear at the top of the column soon after the reaction temperature reached 150°C.

The temperature was held at 150°C. for 2 hours and then allowed to increase to 180°C., where it was held for an additional hour. By this time 80% of the theoretical methanol had been collected in the receiver. The column was then removed from the system. Carefully, water aspirator vacuum was applied. At this stage, some very small amounts of unreacted dimethyl terephthalate may sometimes be observed to sublime. The temperature was gradually increased over the next hour to 200°C. At 200°C. high vacuum of about 0.5 mm. Hg. was applied, and the temperature increased to 260°C. After 2 hours the vacuum was released by admitting nitrogen. The molten polymer was dumped onto a Teflon board. The product had a ball and ring melting point of 185°C. and an inherent viscosity of 0.655.

EXAMPLE III

Using the procedure set out in Example II, other polyesters were made. The compositions and properties of the polyester of Example II and the other polyesters are shown in Table 1.

1. A polyester having an inherent viscosity of about 0.4 to 1.0 measured in orthochlorophenol solvent, at a concentration of 0.5% by weight and at a temperature of 30°C. consisting essentially of the condensation product of 1,4-butanediol, terephthalic acid, isophthalic acid and a cyclical dicarboxylic acid having the structural formula

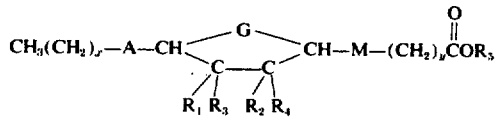

wherein $x$ is 1 to 3, $y$ is 5 to 8, and the sum of $x$ and $y$ is 6 to 11, $R_1$ and $R_2$ are H or $CH_3$ and at least one is H, and $R_3$ and $R_4$ are H, $-COOH$, $-COOCH_3$ or $-COOCH_2CH_3$ with the proviso that one of such radicals must be H and the other must be $-COOH$, $-COOCH_3$ or $-COOCH_2CH_3$ $R_5$ is $-COOH$, $-COOCH_3$ or $-COOCH_2CH_3$, A, G and M are selected from $-CH_2CH_2-$ and $-CH=CH-$ groups with the proviso that A, G and M all can be $-CH_2-CH_2-$ groups and when G is $-CH=CH-$, A and M can be $-CH_2CH_2-$ or $-CH=CH-$ but one must be $-CH_2CH_2-$ and the other $-CH=CH-$, wherein the 1,4-butanediol component and the total acid component are in an equivalent ratio of about 1:1 and the equivalent percent of the acids based upon the total acid equivalent are about 65 to 75 equivalent percent terephthalic acid, about 20 to 25 equivalent percent isophthalic acid and about 5 to 10 equivalent percent dicarboxylic acid having the above structural formula.

Table 1

| Composition Equivalent Percent | | | | | | | | |
|---|---|---|---|---|---|---|---|---|
| Terephthalic Acid | Isophthalic Acid | Cyclical Dicarboxylic Acid | Ball & Ring Melting Point °C. | Inherent Viscosity | Ultimate Tensile Strength | Percent Elongation | 2% Tensile Modulus | Yield Stress |
| * 70 | 20 | 10 | 185 | 0.655 | 5510 | 521 | 35,100 | 2740 |
| 73 | 22 | 5 | 196 | 0.685 | 6350 | 502 | 87,800 | 6350 |
| 32 | 58 | 10 | 128 | 0.495 | 480 | 1256 | 253 | 74 |
| Sebacic Acid Modified Polyester ** | | | 190 | 0.596 | 4620 | 22 | 44,800 | 2820 |

* Polyester of Example II
** A polyester containing 1,4-butanediol, 70 equivalent percent terephthalic acid, 10 equivalent percent isophthalic acid and 20 equivalent percent sebacic acid having a Ball and Ring Melting Point of 190°C. and Inherent Viscosity of 0.596.

The embodiments of the invention in which an exclusive property or privilege is claimed are defined as follows:

2. The polyester of claim 1 wherein the cyclic dicarboxylic acid component is a hydrogenated addition product of methyl acrylate and methyl eleostearate.